US012719722B2

(12) United States Patent
Lee et al.

(10) Patent No.: US 12,719,722 B2
(45) Date of Patent: Aug. 25, 2026

(54) METHOD AND APPARATUS FOR EVALUATING PERFORMANCE OF CHANNEL ESTIMATION IN COMMUNICATION SYSTEM

(71) Applicant: Electronics and Telecommunications Research Institute, Daejeon (KR)

(72) Inventors: An Seok Lee, Daejeon (KR); Yong Jin Kwon, Daejeon (KR); Heesoo Lee, Daejeon (KR); Yun Joo Kim, Daejeon (KR); Hyun Seo Park, Daejeon (KR); Yu Ro Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 705 days.

(21) Appl. No.: 18/085,123

(22) Filed: Dec. 20, 2022

(65) Prior Publication Data

US 2023/0198814 A1 Jun. 22, 2023

(30) Foreign Application Priority Data

Dec. 20, 2021 (KR) ........................ 10-2021-0182786
Dec. 12, 2022 (KR) ........................ 10-2022-0172435

(51) Int. Cl.
*H04L 25/02* (2006.01)
*H04W 24/08* (2009.01)

(52) U.S. Cl.
CPC ......... *H04L 25/0254* (2013.01); *H04W 24/08* (2013.01)

(58) Field of Classification Search
CPC ........................... H04L 25/0254; H04W 24/08
See application file for complete search history.

(56) References Cited

U.S. PATENT DOCUMENTS

| | | | | |
|---|---|---|---|---|
| 10,911,266 | B2 | 2/2021 | Cao et al. | |
| 11,178,658 | B2 | 11/2021 | Lee et al. | |
| 2016/0269160 | A1 | 9/2016 | Noh et al. | |
| 2018/0337717 | A1 | 11/2018 | Nasiri Khormuji et al. | |
| 2019/0245603 | A1 * | 8/2019 | Yum ..................... | H04W 72/23 |
| 2020/0133854 | A1 | 4/2020 | Yang et al. | |
| 2020/0229206 | A1 | 7/2020 | Badic et al. | |
| 2021/0006989 | A1 | 1/2021 | Lee et al. | |
| 2021/0219161 | A1 | 7/2021 | Hu et al. | |
| 2022/0006543 | A1 | 1/2022 | Jeon et al. | |

FOREIGN PATENT DOCUMENTS

| | | | | |
|---|---|---|---|---|
| EP | 4319070 A1 * | 2/2024 | ......... | H04L 25/0254 |
| WO | 2022/000365 | 1/2022 | | |

* cited by examiner

*Primary Examiner* — Natasha W Cosme
(74) *Attorney, Agent, or Firm* — KILE PARK REED & HOUTTEMAN PLLC

(57) ABSTRACT

An operation method of a terminal using a channel estimation artificial intelligence (AI) model may comprise: receiving, from a base station, information on the channel estimation AI model; performing first channel estimation using the channel estimation AI model by receiving a first signal A from a base station; and receiving, from the base station, data based on the estimated channel.

26 Claims, 16 Drawing Sheets

100
110-1
110-2
110-3
120-1
120-2
130-1
130-2
130-3
130-4
130-5
130-6

200
220
memory
ROM
RAM
210
processor
input interface device
240
output interface device
250
270
storage device
260
transceiver
230

METHOD AND APPARATUS FOR EVALUATING PERFORMANCE OF CHANNEL ESTIMATION IN COMMUNICATION SYSTEM

CROSS-REFERENCE TO RELATED APPLICATIONS

This application claims priority to Korean Patent Applications No. 10-2021-0182786, filed on Dec. 20, 2021, and No. 10-2022-0172435, filed on Dec. 12, 2022 with the Korean Intellectual Property Office (KIPO), the entire contents of which are hereby incorporated by reference.

BACKGROUND

1. Technical Field

Exemplary embodiments of the present disclosure relate to a technique for evaluating performance of channel estimation, and more specifically, to a technique for evaluating performance of channel estimation in a communication system, which evaluates performance of channel estimation based on artificial intelligence (AI).

2. Related Art

With the development of information and communication technologies, various wireless communication technologies are being developed. As the representative wireless communication technologies, there may be long term evolution (LTE), new radio (NR), or the like defined as the 3rd generation partnership project (3GPP) specifications. The LTE may be one of 4th generation (4G) wireless communication technologies, and the NR may be one of 5th generation (5G) wireless communication technologies.

For the processing of rapidly increasing wireless data after the commercialization of the 4th generation (4G) communication system (e.g., Long Term Evolution (LTE) communication system or LTE-Advanced (LTE-A) communication system), the 5th generation (5G) communication system (e.g., new radio (NR) communication system) that uses a frequency band (e.g., a frequency band of 6 GHz or above) higher than that of the 4G communication system as well as a frequency band of the 4G communication system (e.g., a frequency band of 6 GHz or below) is being considered. The 5G communication system may support enhanced Mobile BroadBand (eMBB), Ultra-Reliable and Low-Latency Communication (URLLC), and massive Machine Type Communication (mMTC).

In such the communication system, a channel estimation technique may be required for reliable reception of a radio transmission signal. In the existing mobile communication technologies up to the 4G, a terminal performs channel estimation based on cell-specific common reference signals. Also, in the mobile communication technologies from the 4G to the current 5G, the terminal performs channel estimation based on demodulation reference signals (DM-RSs) for reception for each terminal. Meanwhile, among channel estimation methods, a linear minimum mean squared error (linear MMSE) method may be a method for performing channel estimation using reference signals. Such the MMSE method may require estimation of a correlation matrix between a reference signal resource and a target resource. The estimation of the correlation matrix for this purpose may require high computational complexity. As another channel estimation technique, a least square (LS) method may exist. The LS method may be widely used due to its low complexity. However, the LS method may have relatively low channel estimation performance.

SUMMARY

Exemplary embodiments of the present disclosure provide a method and an apparatus for evaluating performance of channel estimation in a communication system, which evaluate performance of channel estimation based on artificial intelligence (AI).

According to a first exemplary embodiment of the present disclosure, an operation method of a terminal using a channel estimation AI model in a communication system may comprise: performing first channel estimation using the channel estimation AI model by receiving a first signal A from a base station; and receiving, from the base station, data based on the estimated channel.

The signal A may be a signal used for channel estimation as a reference signal. The signal B is a reference broadcasting signal or a dedicated signal and may be a signal used for transmission of a data signal or transmission of a control signal.

The operation method may further comprise: receiving, from the base station, performance evaluation configuration information including information on a first threshold; performing second channel estimation by receiving a second signal A from the base station; calculating a first reception performance indicator by receiving a first signal B from the base station based on the second channel estimation; performing third channel estimation using the channel estimation AI model by receiving a third signal A from the base station; calculating a second reception performance indicator by receiving a second signal B from the base station based on the third channel estimation; and requesting application of the channel estimation AI model to the base station when the second reception performance indicator is greater by the first threshold or more than the first reception performance indicator.

The first reception performance indicator may be a log likelihood ratio (LLR) value when receiving the first signal B, and the second reception performance indicator may be an LLR value when receiving the second signal B.

The performance evaluation configuration information may further include information on a number of performance evaluation iterations, and the terminal may use an average value obtained by performing multiple reception performance evaluations according to the number of performance evaluation iterations as the first reception performance indicator or the second reception performance indicator.

The third signal A is a signal obtained by reducing a density of the second signal A in unit of a code division multiplexing (CDM) group or a signal obtained by reducing the density of the second signal A in unit of a resource block (RB).

The operation method may further comprise receiving, from the base station, density reduction configuration information for the signal A, which includes at least one of information on a resource reduction unit, information on a density reduction level, or information on an offset for each symbols, wherein the terminal receives the first signal A based on the density reduction configuration information.

The operation method may further comprise: performing fourth channel estimation using the channel estimation AI mode by receiving a fourth signal A from the base station; calculating a third reception performance indicator by receiving a third signal B from the base station based on the fourth channel estimation; and reporting a result of performance degradation of the channel estimation AI model to the base station when the first reception performance indicator is greater by a second threshold or more than the third reception performance indicator.

The operation method may further comprise: when the result of the performance degradation further includes information on channel characteristics, receiving, from the base station, information on a channel estimation AI model changed based on the channel characteristics; and performing channel estimation using the changed channel estimation AI model.

The operation method may further comprise: receiving, from the base station, update configuration information including information on a gradient vector generation periodicity and information on a gradient vector transmission periodicity; and calculating a gradient vector of a deep neural network based on the data according to the gradient vector generation periodicity.

The operation method may further comprise transmitting the calculated gradient vector to the base station according to the gradient vector transmission periodicity.

The operation method may further comprise updating the channel estimation AI model using the calculated gradient vector.

The calculating of the gradient vector may comprise: generating information on a reception signal from the downlink data; identifying transmission data from the downlink data; generating information on a transmission signal from the transmission data; generating actual channel information using information on the transmission signal and information on the reception signal; generating error information by comparing channel information estimated using the channel estimation AI model with the actual channel information; and calculating the gradient vector of the deep neural network by applying a backward propagation method to the error information.

Each of the first signal B and the second signal B may be a reference broadcasting signal or dedicated signal.

According to a second exemplary embodiment of the present disclosure, an operation method of a base station in a communication system may comprise: receiving, from a terminal, first channel characteristic information; selecting a channel estimation AI model suitable for the terminal based on the first channel characteristic information; transmitting, to the terminal, information on the selected channel estimation AI model; transmitting, to the terminal, a first signal A used for channel estimation and a first signal B used for reception performance evaluation; and receiving, from the terminal, a first reception performance indicator for the channel estimation AI model.

The operation method may further comprise: receiving, from the terminal, a model change request signal including second channel characteristic information; selecting a channel estimation AI model changed based on the second channel characteristic information; and transmitting, to the terminal, information on the changed channel estimation AI model.

The operation method may further comprise: receiving, from the terminal, a second reception performance indicator including second channel characteristic information; selecting a channel estimation AI model changed based on the second channel characteristic information when the second reception performance indicator is lower by a threshold or more than the first reception performance indicator; and transmitting, to the terminal, information on the changed channel estimation AI model.

The operation method may further comprise: transmitting, to the terminal, update configuration information including information on a gradient vector generation periodicity and information on a gradient vector transmission periodicity; transmitting, to the terminal, downlink data according to the gradient vector generation periodicity; receiving, from the terminal, a gradient vector calculated based on the downlink data according to the gradient vector transmission periodicity; and updating the channel estimation AI model based on the gradient vector.

According to a third exemplary embodiment of the present disclosure, an operation method of a terminal in a communication system may comprise: receiving, from a base station, transmission information of dedicated data; performing channel estimation using a channel estimation AI model; and calculating a gradient vector based on a result of the channel estimation using the channel estimation AI model and a result of receiving the dedicated data.

The operation method may further comprise transmitting the calculated gradient vector to the base station.

The operation method may further comprise updating the channel estimation AI model using the calculated gradient vector.

According to the present disclosure, a channel estimation performance evaluation apparatus can effectively evaluate improved channel estimation performance based on AI. In addition, the channel estimation performance evaluation apparatus can be used to effectively receive a radio transmission signal in a receiver. In addition, the channel estimation performance evaluation apparatus can be mainly used in a receiver of a terminal to effectively receive downlink transmission of a radio cellular network. In addition, the channel estimation performance evaluation apparatus can be applied to a reception procedure of uplink transmission, and can be applied to various configurations such as a relay of the radio network.

Further, the channel estimation performance evaluation apparatus according to the present disclosure can effectively evaluate a degraded channel estimation performance based on AI. Accordingly, the base station may instruct the terminal to change an AI model being applied. As a result, the terminal can use the changed AI model and can actively cope with the performance degradation of channel estimation.

DETAILED DESCRIPTION OF THE EMBODIMENTS

Figure 1:
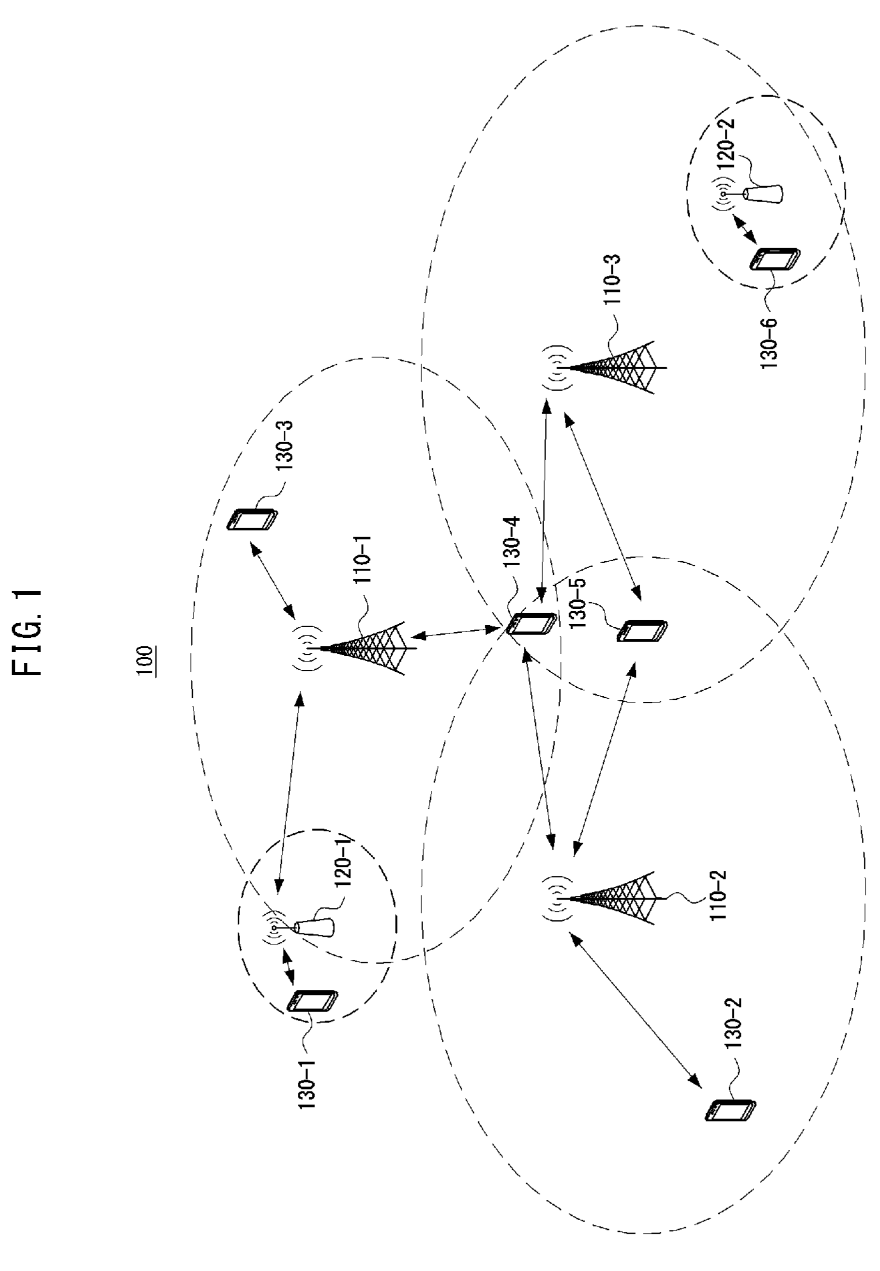
FIG. 1 is a conceptual diagram illustrating a first exemplary embodiment of a communication system.

Exemplary embodiments of the present disclosure are disclosed herein. However, specific structural and functional details disclosed herein are merely representative for purposes of describing exemplary embodiments of the present disclosure. Thus, exemplary embodiments of the present disclosure may be embodied in many alternate forms and should not be construed as limited to exemplary embodiments of the present disclosure set forth herein.

Accordingly, while the present disclosure is capable of various modifications and alternative forms, specific exemplary embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular exemplary embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a conceptual diagram illustrating a first exemplary embodiment of a communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. Here, the communication system may be referred to as a 'communication network'. Each of the plurality of communication nodes may support code division multiple access (CDMA) based communication protocol, wideband CDMA (WCDMA) based communication protocol, time division multiple access (TDMA) based communication protocol, frequency division multiple access (FDMA) based communication protocol, orthogonal frequency division multiplexing (OFDM) based communication protocol, filtered OFDM based communication protocol, cyclic prefix OFDM (CP-OFDM) based communication protocol, discrete Fourier transform-spread-OFDM (DFT-s-OFDM) based communication protocol, orthogonal frequency division multiple access (OFDMA) based communication protocol, single-carrier FDMA (SC-FDMA) based communication protocol, non-orthogonal multiple access (NOMA) based communication protocol, generalized frequency division multiplexing (GFDM) based communication protocol, filter band multi-carrier (FBMC) based communication protocol, universal filtered multi-carrier (UFMC) based communication protocol, space division multiple access (SDMA) based communication protocol, or the like. Each of the plurality of communication nodes may have the following structure.

Figures 2, 3:
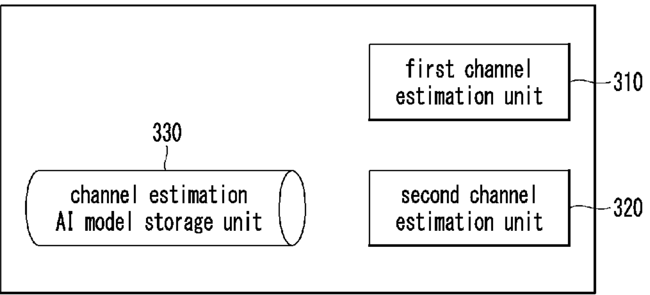
FIG. 2 is a block diagram illustrating a first exemplary embodiment of a communication node constituting a communication system.
FIG. 3 is a block diagram illustrating a first exemplary embodiment of a channel estimation performance evaluation apparatus in a communication system.

FIG. 2 is a block diagram illustrating a first exemplary embodiment of a communication node constituting a communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. The respective components included in the communication node 200 may communicate with each other as connected through a bus 270. However, the respective components included in the communication node 200 may be connected not to the common bus 270 but to the processor 210 through an individual interface or an individual bus. For example, the processor 210 may be connected to at least one of the memory 220, the transceiver 230, the input interface device 240, the output interface device 250, and the storage device 260 through dedicated interfaces.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to the cell coverage of the first base station 110-1. Also, the second terminal 130-2, the fourth terminal 130-4, and the fifth terminal 130-5 may belong to the cell coverage of the second base station 110-2. Also, the fifth base station 120-2, the fourth terminal 130-4, the fifth terminal 130-5, and the sixth terminal 130-6 may belong to the cell coverage of the third base station 110-3. Also, the first terminal 130-1 may belong to the cell coverage of the fourth base station 120-1, and the sixth terminal 130-6 may belong to the cell coverage of the fifth base station 120-2.

Here, each of the plurality of base stations 110-1, 110-2, 110-3, 120-1, and 120-2 may be referred to as NodeB (NB), evolved NodeB (eNB), gNB, advanced base station (ABS), high reliability-base station (HR-BS), base transceiver station (BTS), radio base station, radio transceiver, access point (AP), access node, radio access station (RAS), mobile multihop relay-base station (MMR-BS), relay station (RS), advanced relay station (ARS), high reliability-relay station (HR-RS), home NodeB (HNB), home eNodeB (HeNB), road side unit (RSU), radio remote head (RRH), transmission point (TP), transmission and reception point (TRP), relay node, or the like. Each of the plurality of terminals 130-1, 130-2, 130-3, 130-4, 130-5, and 130-6 may be referred to as user equipment (UE), terminal equipment (TE), advanced mobile station (AMS), high reliability-mobile station (HR-MS), terminal, access terminal, mobile terminal, station, subscriber station, mobile station, portable subscriber station, node, device, on-board unit (OBU), or the like.

Each of the plurality of communication nodes 110-1, 110-2, 110-3, 120-1, 120-2, 130-1, 130-2, 130-3, 130-4, 130-5, and 130-6 may support cellular communication (e.g., LTE, LTE-Advanced (LTE-A), etc.) defined in the 3rd generation partnership project (3GPP) specification. Each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul link or a non-ideal backhaul link, and exchange information with each other via the ideal or non-ideal backhaul. Also, each of the plurality of base stations 110-1, 110-2, 110-3, 120-1, and 120-2 may be connected to the core network through the ideal backhaul link or non-ideal backhaul link. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Each of the plurality of base stations 110-1, 110-2, 110-3, 120-1, and 120-2 may support OFDMA-based downlink (DL) transmission, and SC-FDMA-based uplink (UL) transmission. In addition, each of the plurality of base stations 110-1, 110-2, 110-3, 120-1, and 120-2 may support a multi-input multi-output (MIMO) transmission (e.g., single-user MIMO (SU-MIMO), multi-user MIMO (MU-MIMO), massive MIMO, or the like), a coordinated multipoint (CoMP) transmission, a carrier aggregation (CA) transmission, a transmission in unlicensed band, a device-to-device (D2D) communication (or, proximity services (ProSe)), an Internet of Things (IoT) communication, a dual connectivity (DC), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2).

In such the communication system, a channel estimation technique may be required for reliable reception of a radio transmission signal. In the existing mobile communication technologies up to the 4G, a terminal performs channel estimation based on cell-specific common reference signals. Also, in the mobile communication technologies from the 4G to the current 5G, the terminal performs channel estimation based on demodulation reference signals (DM-RSs) for reception for each terminal.

Meanwhile, among channel estimation methods, a linear minimum mean squared error (linear MMSE) method may be a method for performing channel estimation using reference signals. Such the MMSE method may require estimation of a correlation matrix between a reference signal resource and a target resource. The estimation of the correlation matrix for this purpose may require high computational complexity. As another channel estimation technique, a least square (LS) method may exist. The LS method may be widely used due to its low complexity. However, the LS method may have relatively low channel estimation performance.

Meanwhile, a channel estimation technique using artificial intelligence (AI) is being studied to solve the problems of the above-mentioned channel estimation methods. Such the channel estimation technique using AI may require pre-training to produce good channel estimation performance for all environments. However, such the pre-training may be difficult in reality. In addition, the pre-training may rather degrade performance in an environment where it is difficult to obtain improved channel estimation performance.

Accordingly, an objective of the present disclosure is to propose a method for effectively obtaining improved channel estimation performance based on AI. In the present disclosure, a radio channel estimation performance evaluation technique may be used in a receiver to receive a radio transmission signal. In addition, the radio channel estimation performance evaluation technique in the present disclosure may be mainly used in a receiver of a terminal to receive downlink transmission of a radio cellular network. However, the radio channel estimation performance evaluation technique of the present disclosure may also be applied to a reception procedure for uplink transmission, and may be applied to various configurations such as relays or the like of the radio network. In the description below, an example of a network apparatus may be a base station or a control apparatus within a network.

FIG. 3 is a block diagram illustrating a first exemplary embodiment of a channel estimation performance evaluation apparatus in a communication system.

Referring to FIG. 3, a channel estimation performance evaluation apparatus in a communication system may comprise a first channel estimation unit 310, a second channel estimation unit 320, and a channel estimation AI model storage unit 330. The channel estimation performance evaluation apparatus may be included in a terminal. The first channel estimation unit 310 may perform channel estimation using the LS method, the MISE method, or the like. In addition, the second channel estimation unit 320 may perform channel estimation using each channel estimation AI model stored in the channel estimation AI model storage unit 330. The channel estimation AI model storage unit 330 may store information on channel estimation AI models.

In the-above described situation, the base station may transmit a reference signal to the terminal. Then, the first channel estimation unit 310 included in the terminal may perform channel estimation by receiving the reference signal (i.e., signal A). The base station may transmit a reference broadcasting signal (i.e., signal B) to the terminal. Here, the reference broadcasting signal may be a periodically-broadcast signal such as a synchronization signal block (SSB).

Accordingly, the first channel estimation unit 310 of the terminal may receive the reference broadcasting signal based on a channel estimated using the reference signal (i.e., signal A). In addition, the first channel estimation unit 310 of the terminal may evaluate a reception performance of the received reference broadcasting signal. In this case, an indicator representing the reception performance evaluated by the first channel estimation unit 310 of the terminal may be a log likelihood ratio (LLR) value when receiving the reference broadcasting signal. The first channel estimation unit 310 of the terminal may calculate an average value of reception performances evaluated for the reference broadcasting signals received multiple times. For example, the average value of the reception performances evaluated by the first channel estimation unit 310 of the terminal may be a basic average LLR value. Here, the basic average LLR value may be expressed also as a baseline LLR (i.e., LLR_baseline) value.

Meanwhile, the base station may transmit a reference signal (i.e., signal A) to the terminal. Then, the second channel estimation unit 320 included in the terminal may perform channel estimation using each channel estimation AI model by receiving the reference signal. The base station may transmit a reference broadcasting signal (i.e., signal B) to the terminal. Here, the reference broadcasting signal may be a periodically-broadcast signal such as an SSB.

Accordingly, the second channel estimation unit 320 of the terminal may receive the reference broadcasting signal based on each channel estimated using each channel estimation AI model. In addition, the second channel estimation unit 320 of the terminal may evaluate a reception performance of each estimated channel for the received reference broadcasting signal.

In this case, an indicator representing the reception performance evaluated by the second channel estimation unit 320 of the terminal may be a LLR value when receive the reference broadcasting signal. The second channel estimation unit 320 of the terminal may calculate an average value of reception performances evaluated for the reference broadcast signals received multiple times. For example, the average value of the reception performances evaluated by the second channel estimation unit 320 of the terminal may be an AI average LLR value. Here, the AI average LLR value may be expressed also as an AI LLR (i.e., LLR_ai) value.

Figure 4:
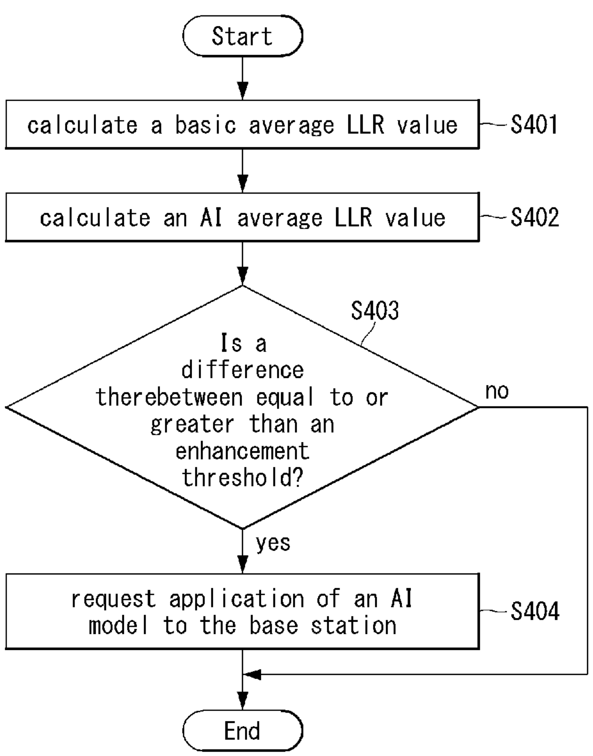
FIG. 4 is a flowchart illustrating a first exemplary embodiment of a channel estimation performance evaluation method in a communication system.

FIG. 4 is a flowchart illustrating a first exemplary embodiment of a channel estimation performance evaluation method in a communication system.

Referring to FIG. 4, the base station may generate channel estimation performance evaluation configuration information for configuring a channel estimation performance evaluation function in the terminal. In this case, the channel estimation performance evaluation configuration information may include information on a channel estimation performance evaluation interval, information on the number of iterations of the performance evaluation when performing the performance evaluation, information on a threshold, and/or the like.

The base station may transmit the generated channel estimation performance evaluation configuration information to the second channel estimation unit of the terminal. Then, the second channel estimation unit of the terminal may receive the channel estimation performance evaluation configuration information from the base station. Then, the second channel estimation unit of the terminal may configure the channel estimation performance evaluation function according to the received channel estimation performance evaluation configuration information.

Meanwhile, the base station may transmit a reference signal to the terminal. The first channel estimation unit included in the terminal may perform channel estimation by receiving the reference signal. In addition, the base station may transmit a reference broadcasting signal to the terminal. Here, the reference broadcasting signal may be a periodically-broadcast signal such as an SSB. Accordingly, the first channel estimation unit of the terminal may receive the reference broadcasting signal based on a channel estimated using the reference signal. Then, the first channel estimation unit of the terminal may evaluate a reception performance of the received reference broadcasting signal.

In this case, the first channel estimation unit of the terminal may evaluate the reception performance of the reference broadcast signal several times according to the number of iterations of the performance evaluation. In this case, an indicator representing the reception performance evaluated by the first channel estimation unit of the terminal may be an LLR value when receiving the reference broadcasting signal. The first channel estimation unit of the terminal may calculate an average value of reception performances performed multiple times according to the number of iterations of the performance evaluation (S401). For example, the average value of reception performances evaluated by the first channel estimation unit of the terminal may be a basic average LLR value. Here, the basic average LLR value may be expressed also as a baseline LLR value.

Meanwhile, the base station may transmit a reference signal to the terminal. Then, the second channel estimation unit included in the terminal may perform channel estimation using each channel estimation AI model by receiving the reference signal. In addition, the base station may transmit a reference broadcast signal to the terminal. Here, the reference broadcasting signal may be a periodically-broadcast signal such as an SSB. Accordingly, the second channel estimation unit of the terminal may receive the reference broadcast signal based on each channel estimated using each channel estimation AI model.

In addition, the second channel estimation unit of the terminal may evaluate the reception performance of each channel estimated for the received reference broadcasting signal. In this case, the second channel estimation unit of the terminal may evaluate the reception performance of the reference broadcasting signal multiple times according to the number of iterations of the performance evaluation. In this case, an indicator representing the reception performance evaluated by the second channel estimation unit of the terminal may be an LLR value when receiving the reference broadcasting signal.

As a result, the second channel estimation unit of the terminal may calculate an average value of reception performances evaluated for the reference broadcasting signals received multiple times according to the number of iterations of the performance evaluation (S402). For example, the average value of reception performances evaluated by the second channel estimation unit of the terminal may be an AI average LLR value. Here, the AI average LLR value may be expressed also as an AI LLR value.

Meanwhile, the second channel estimation unit of the terminal may compare an AI LLR value evaluated for each channel estimated using each AI model with the basic LLR value for the corresponding channel. In addition, the second channel estimation unit of the terminal may calculate a difference between each AI LLR value and the basic LLR value. Thereafter, the second channel estimation unit of the terminal may determine whether the difference is greater than or equal to an enhancement threshold (S403). Here, the enhancement threshold may be a preconfigured value.

As a result of the determination, the second channel estimation unit of the terminal may select channel estimation AI models for which the calculated difference is greater than or equal to the enhancement threshold. Then, the second channel estimation unit of the terminal may request application of an channel estimation AI model by transmitting information on model identifiers for the selected channel estimation AI models having a difference equal to or greater than the enhancement threshold to the base station (S404).

In this case, the second channel estimation unit of the terminal may transmit a channel estimation performance evaluation result evaluated for each of the selected channel estimation AI models to the base station. Here, the performance evaluation result may be the AI LLR value evaluated for the channel estimated using the channel estimation AI model. Alternatively, the performance evaluation result may be a difference between the AI LLR value evaluated for each channel estimated using the channel estimation AI model and the basic LLR value corresponding thereto.

Then, the base station may receive the information on the model identifiers for the selected channel estimation AI models from the second channel estimation unit of the terminal, and may receive the application request for the selected AI models. In addition, the base station may receive the performance evaluation result of channel estimation evaluated for each of the channel estimation AI models selected from the second channel estimation unit of the terminal.

Here, the performance evaluation result may be the AI LLR value evaluated for a channel estimated using the channel estimation AI model. Alternatively, the performance evaluation result may be a difference between the basic LLR value and the AI LLR value evaluated for each channel estimated using the channel estimation AI model and the basic LLR value corresponding thereto.

Accordingly, the base station may perform channel estimation using one AI model among the channel estimation AI models selected based on the information on the received model identifiers. In this case, the base station may perform channel estimation using one AI model in consideration of the performance evaluation results of the selected AI channel estimation models.

For example, the base station may perform channel estimation by applying a channel estimation AI model having the best performance evaluation result among the selected channel estimation AI models. Here, the channel estimation AI model having the best performance evaluation result may have the largest difference value.

Here, the channel estimation AI model having the best performance evaluation result may have the maximum difference value. Alternatively, the channel estimation AI model having the best performance evaluation result may have the maximum AI LLR value.

Meanwhile, the second channel estimation unit of the terminal may request application of an AI model to the base station by transmitting information of a model identifier of the channel estimation AI model having the maximum difference (or having the maximum AI LLR value) among the selected channel estimation AI models having a difference equal to or greater than the enhancement threshold. Then, the base station may receive the information of the model identifier for the channel estimation AI model having the maximum difference among the selected channel estimation AI models from the second channel estimation unit of the terminal, and receive the request for the application of the selected AI model.

Accordingly, the base station may identify that the corresponding receiver can obtain improved channel estimation performance based on the channel estimation AI model. Based thereon, the base station may obtain improved channel estimation performance by performing channel estimation by applying the channel estimation AI model selected based on the received information of the model identifier.

Such the channel estimation performance evaluation may be periodically performed by the second channel estimation unit of the terminal at an interval according to the performance evaluation interval. The performance evaluation result may include information on the channel estimation AI model. Here, the information on the channel estimation AI model may include information expressing channel characteristics suitable for the operation of the corresponding AI channel estimation model.

For example, the information on the channel estimation AI model may be information obtained by expressing characteristics of the channel as delay spread and Doppler frequency shift and quantizing the two values. In addition, the information on the channel estimation AI model may include information such as a signal to interference plus noise ratio (SINR). Meanwhile, the base station may reduce a density of reference signals when transmitting downlink data to the corresponding receiver.

Figure 5:
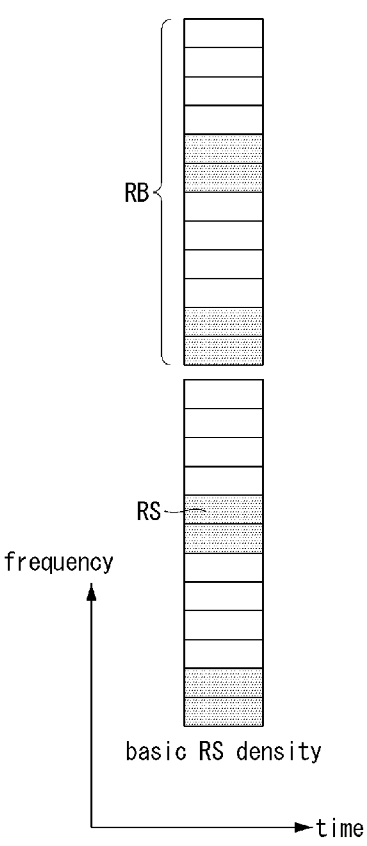
FIG. 5 is a conceptual diagram illustrating a first exemplary embodiment of reference signals.

FIG. 5 is a conceptual diagram illustrating a first exemplary embodiment of reference signals.

Referring to FIG. 5, a reference signal (RS) may be arranged in 4 resource elements (REs) in one resource block (RB) of one symbol.

Figure 6:
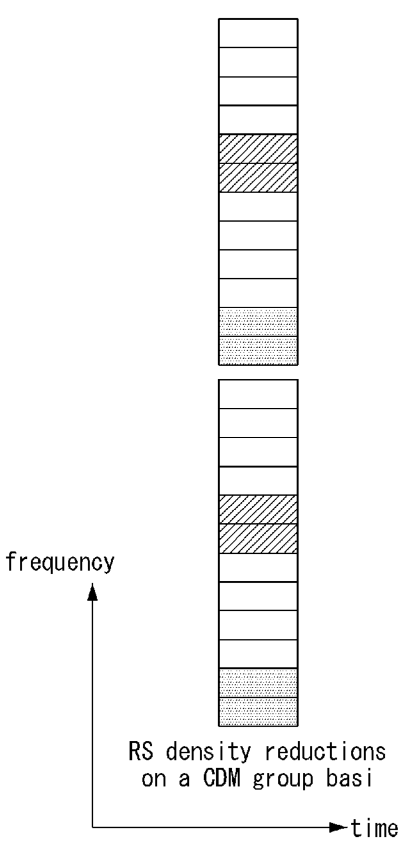
FIG. 6 is a conceptual diagram illustrating a second exemplary embodiment of reference signals.

FIG. 6 is a conceptual diagram illustrating a second exemplary embodiment of reference signals.

Referring to FIG. 6, a reference signal may be arranged in two REs in one RB of one symbol. A density of the reference signals of FIG. 6 may be reduced compared to a density of the reference signals of FIG. 5. When reduction of the reference signals is performed in units of REs, it may be performed in unit of a code division multiplexing (CDM) group composed of adjacent REs.

Figure 7:
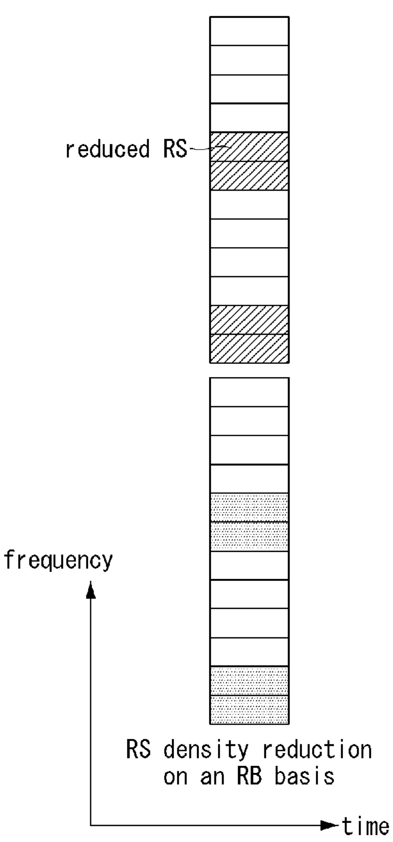
FIG. 7 is a conceptual diagram illustrating a third exemplary embodiment of reference signals.

FIG. 7 is a conceptual diagram illustrating a third exemplary embodiment of reference signals.

Referring to FIG. 7, a reference signal may be arranged in two REs in a first RB of one symbol. In addition, none of the reference signals may be arranged in a second RB of the one symbol. A density of reference signals in the first RB of FIG. 7 may not be reduced compared to the density of reference signals of FIG. 5. However, a density of reference signals in the second RB of FIG. 7 may be reduced compared to the density of the reference signals of FIG. 5. As such, the reduction of the reference signal may be performed in unit of an allocated RB.

Figure 8:
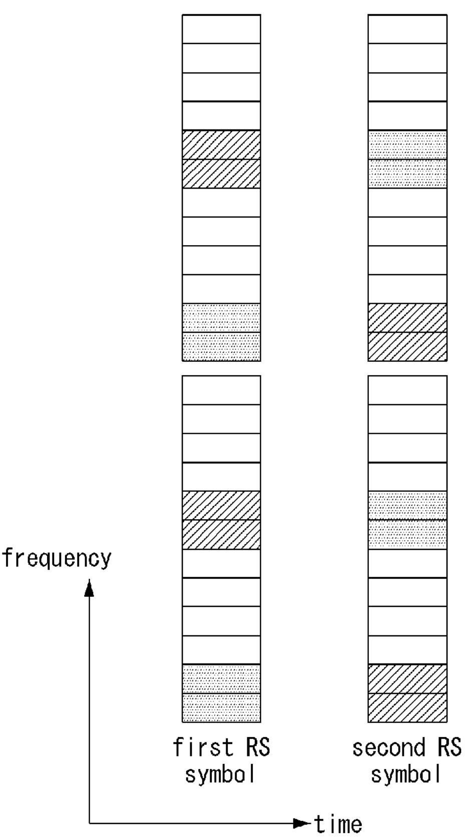
FIG. 8 is a conceptual diagram illustrating a fourth exemplary embodiment of reference signals.

FIG. 8 is a conceptual diagram illustrating a fourth exemplary embodiment of reference signals.

Referring to FIG. 8, a reference signal may be arranged in two REs of a first subcarrier and a second subcarrier in a first RB of a first reference signal symbol. In addition, the reference signal may be arranged in two REs of a first subcarrier and a second subcarrier in a first RB of a second reference signal symbol.

Then, a reference signal may be arranged in two REs of a seventh subcarrier and an eighth subcarrier in the first RB of the second reference signal symbol. Also, a reference signal may be arranged in two REs of the seventh subcarrier and the eighth subcarrier in a second RB of the second reference signal symbol. As such, when the number of symbols of the reference signal to be transmitted is two or more, it is possible to configure a different frequency position of the reduced reference signal for each symbol by differently setting an offset for each symbol.

Meanwhile, the base station may generate reference signal density reduction configuration information. In this case, the reference signal density reduction configuration information may include information on a resource reduction unit, information on a density reduction level, information on an offset for each symbol, and/or the like. Here, the information on the resource reduction unit may include indication information indicating a CDM group unit or an RB unit.

In addition, the information on the density reduction level may include information on a reduction ratio such as ½, ⅓, and ¼. The information on the offset for each symbol may include an offset value for each symbol. The base station may transmit the reference signal density reduction configuration information including such the information to the second channel estimation unit of the terminal. Then, the second channel estimation unit of the terminal may receive the reference signal density reduction configuration information from the base station, and may receive reference signals by referring to the received reference signal density reduction configuration information. Meanwhile, reference signal resources secured by the reference signal density reduction may be utilized as resources for data transmission.

Figure 9:
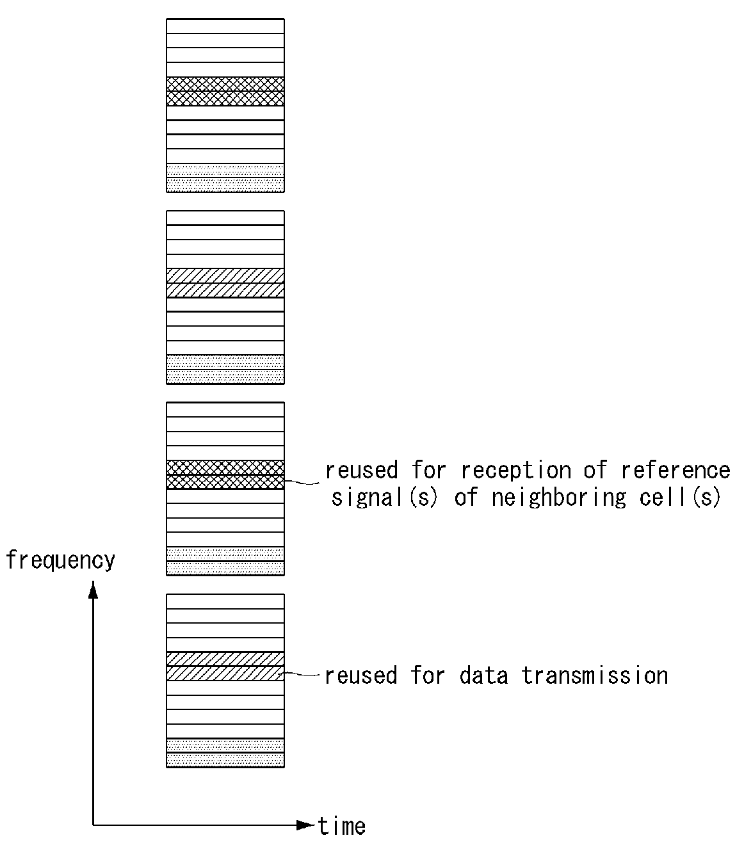
FIG. 9 is a conceptual diagram illustrating a first exemplary embodiment of a method for reusing resources secured through reference signal density reduction.

FIG. 9 is a conceptual diagram illustrating a first exemplary embodiment of a method for reusing resources secured through reference signal density reduction.

Referring to FIG. 9, the base station may perform data transmission using the resources secured through reference signal density reduction, thereby increasing a transmission rate. On the other hand, the resources secured through reference signal density reduction may be used for measurement of reference signals transmitted from neighboring cell base stations or terminals. In this case, the receiver such as an interference suppression receiver (e.g., MMSE-interference rejection combiner (IRC) receiver) may use an interference channel from a neighboring cell measured in a data reception procedure to improve a signal quality (e.g., SINR) of received signals.

The base station may generate transmission information of a transmitting apparatus such as a neighbor cell base station or terminal. In this case, the transmission information may include information on a data transmission direction, information on resource allocation, and the like. Here, the information on the data transmission direction may indicate a downlink transmission direction or an uplink transmission direction. Also, information on resource allocation may be information on allocated frequency and time resources. In this case, the information on resource allocation may include information on whether to perform frequency hopping in uplink transmission. Such the transmission information may be of various types, and may be distinguished using an index.

Meanwhile, the base station may generate resource reuse configuration information when allocating downlink resources in relation to utilization of the resources secured through reference signal density reduction. In this case, the generated resource reuse configuration information may include information on a data resource density, information on a data resource offset, and transmission information of neighboring cells in the secured resources. Here, the information on the data resource density may be 0, ½, 1, or the like. In addition, the information on the data resource offset may include an offset value for the data resource. The transmission information of the neighboring cell may be indicated by an index of the transmission information of the neighboring cell. The base station may deliver the generated resource reuse configuration information to a receiver (e.g., terminal). The receiver may receive the resource reuse configuration information from the base station.

Accordingly, the base station may not transmit reference signals and data in resources other than data resources among the resources secured through reference signal density reduction. The receiver may receive a reference signal of a neighboring cell in the corresponding resources by referring to the transmission information of the neighboring cell. In addition, after the receiver receives the reference signal of the neighboring cell and configures information on an interference channel based on the reference signal, the receiver may utilize it as information on an interference channel for receiving data of resources overlapping with transmission resources of the corresponding neighboring cell.

Figure 10:
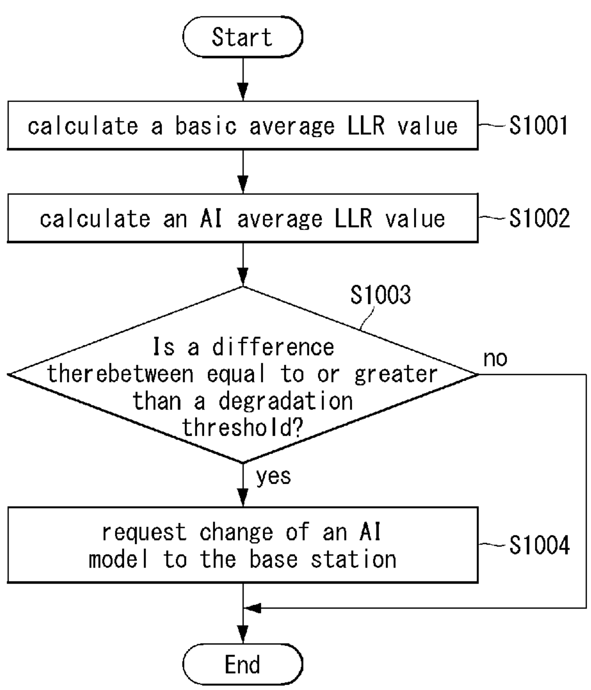
FIG. 10 is a flowchart illustrating a second exemplary embodiment of a channel estimation performance evaluation method in a communication system.

FIG. 10 is a flowchart illustrating a second exemplary embodiment of a channel estimation performance evaluation method in a communication system.

Referring to FIG. 10, the base station may generate channel estimation performance degradation evaluation configuration information for configuring a channel estimation performance degradation evaluation function in the terminal. In this case, the channel estimation performance degradation evaluation configuration information may include information on a channel estimation performance degradation evaluation interval, information on the number of iterations of performance evaluation when performing performance degradation evaluation, information on a degradation threshold, and/or the like. Here, the degradation threshold may be a preconfigured value. The degradation threshold may be equal to the enhancement threshold.

The base station may transmit the generated channel estimation performance degradation evaluation configuration information to the second channel estimation unit of the terminal. Then, the second channel estimation unit of the terminal may receive the channel estimation performance degradation evaluation configuration information from the base station. Then, the second channel estimation unit of the terminal may configure the channel estimation performance degradation evaluation function according to the received channel estimation performance degradation evaluation configuration information.

Meanwhile, the base station may transmit a reference signal to the terminal. The first channel estimation unit included in the terminal may perform channel estimation by receiving the reference signal. In addition, the base station may transmit a reference broadcasting signal to the terminal. Here, the reference broadcasting signal may be a periodically-broadcast signal such as an SSB. Accordingly, the first channel estimation unit of the terminal may receive the reference broadcasting signal based on a channel estimated using the reference signal.

Then, the first channel estimation unit of the terminal may evaluate a reception performance of the received reference broadcasting signal. In this case, the first channel estimation unit of the terminal may evaluate the reception performance of the reference broadcasting signal multiple times according to the number of iterations of performance degradation evaluation.

In this case, an indicator representing the reception performance evaluated by the first channel estimation unit of the terminal may be an LLR value when receiving the reference broadcasting signal. The first channel estimation unit of the terminal may calculate an average value of reception performances performed several times according to the number of iterations of performance degradation evaluation (S1001). For example, the average value of reception performances evaluated by the first channel estimation unit of the terminal may be a basic average LLR value. Here, the basic average LLR value may be expressed also as a baseline LLR value.

Meanwhile, the base station may transmit a reference signal to the terminal. Then, the second channel estimation unit included in the terminal may receive the reference signal and perform channel estimation using a currently-applied channel estimation AI model. In addition, the base station may transmit a reference broadcasting signal to the terminal. Here, the reference broadcasting signal may be a periodically-broadcast signal such as an SSB. Accordingly, the second channel estimation unit of the terminal may receive the reference broadcasting signal based on a channel estimated using the currently-applied channel estimation AI model.

Then, the second channel estimation unit of the terminal may evaluate a reception performance of the reference broadcasting signal received based on the estimated channel. In this case, the second channel estimation unit of the terminal may evaluate the reception performance of the reference broadcasting signal multiple times according to the number of iterations of performance degradation evaluation. In this case, an indicator representing the reception performance evaluated by the second channel estimation unit of the terminal may be an LLR value when receiving the reference broadcasting signal. As a result, the second channel estimation unit of the terminal may calculate an average value of the reception performances evaluated for the reference broadcasting signals received several times according to the number of iterations of performance degradation evaluation (S1002). For example, the average value of the reception performances evaluated by the second channel estimation unit of the terminal may be an applied AI average LLR value. Here, the applied AI average LLR value may be expressed also as an applied AI LLR value.

Meanwhile, the second channel estimation unit of the terminal may compare the basic LLR value with the applied AI LLR value based on the channel estimated using the applied AI model. Then, the second channel estimation unit of the terminal may calculate a difference between the applied AI LLR value and the basic LLR value. In this case, the difference may be a value obtained by subtracting the applied AI LLR value from the basic LLR value. Thereafter, the second channel estimation unit of the terminal may determine whether the difference is greater than or equal to the degradation threshold (S1003).

As a result of the determination, the second channel estimation unit of the terminal may determine that the channel estimation performance has deteriorated to such an extent that it is difficult to use the currently applied channel estimation AI model if the calculated difference is greater than or equal to the degradation threshold. Accordingly, the second channel estimation unit of the terminal may report the degradation of the channel estimation performance evaluation by transmitting the evaluation result of the evaluated channel estimation performance degradation to the base station. Here, the performance degradation evaluation result may be the applied AI LLR value based on the channel estimated using the currently applied channel estimation AI model. Alternatively, the performance degradation evaluation result may be the difference between the basic LLR value and the applied AI LLR value based on the channel estimated using the applied channel estimation AI model.

Then, the base station may receive the performance degradation evaluation result from the second channel estimation unit of the terminal. In addition, the base station may determine that channel estimation performance has deteriorated to the extent that it is difficult for the terminal to use the currently applied channel estimation AI model.

On the other hand, the second channel estimation unit of the terminal may not report the evaluated channel estimation performance degradation. In addition, the second channel estimation unit included in the terminal may receive the reference signal, and perform channel estimation using each channel estimation AI model other than the currently applied channel estimation AI model. Thereafter, the base station may transmit a reference broadcasting signal to the terminal. Here, the reference broadcasting signal may be a periodically-broadcast signal such as an SSB. Accordingly, the second channel estimation unit of the terminal may receive the reference broadcasting signal based on each channel estimated using each channel estimation AI model other than the applied channel estimation AI model.

In addition, the second channel estimation unit of the terminal may evaluate a reception performance for the reference broadcasting signal received based on each estimated channel. In this case, the second channel estimation unit of the terminal may evaluate the reception performance of the reference broadcasting signal multiple times according to the number of iterations of performance degradation evaluation. In this case, an indicator representing the reception performance evaluated by the second channel estimation unit of the terminal may be an LLR value when receiving the reference broadcasting signal. As a result, the second channel estimation unit of the terminal may calculate an average value of reception performances evaluated for the reference broadcasting signals received several times according to the number of iterations of performance degradation evaluation. For example, the average value of reception performances evaluated by the second channel estimation unit of the terminal may be an AI average LLR value. Here, the AI average LLR value may be expressed also as an AI LLR value.

Meanwhile, the second channel estimation unit of the terminal may compare each AI LLR value based on each channel estimated using each AI model other than the currently-applied channel estimation AI model with the basic LLR value. Then, the second channel estimation unit of the terminal may calculate a difference between each AI LLR value and the basic LLR value. In this case, the difference may be a value obtained by subtracting each AI LLR value from the basic LLR value. Thereafter, the second channel estimation unit of the terminal may determine whether the difference is greater than or equal to a performance threshold. Here, the performance threshold may be a preconfigured value. The performance threshold may be equal to the enhancement threshold.

As a result of the determination, the second channel estimation unit of the terminal may select channel estimation AI models having a calculated difference equal to or greater than the performance threshold. In addition, the second channel estimation unit of the terminal may perform channel estimation using a changed channel estimation AI model by changing the applied channel estimation AI model to one of the selected channel estimation AI models. In this case, the base station may perform channel estimation by selecting the one AI model in consideration of the performance evaluation results of the selected AI channel estimation models. For example, the base station may perform channel estimation by selecting a channel estimation AI model having the best performance evaluation result from the selected channel estimation AI models. Here, the channel estimation AI model having the best performance evaluation result may have the largest difference. Here, the channel estimation AI model having the best performance evaluation result may have the maximum difference. Alternatively, the channel estimation AI model having the best performance evaluation result may have the maximum AI LLR value.

Thereafter, the second channel estimation unit of the terminal may request a change of the channel estimation AI model by transmitting information on a model identifier of the changed channel estimation AI model to the base station (S1004). In this case, the second channel estimation unit of the terminal may transmit a channel estimation performance evaluation result evaluated for the changed channel estimation AI model to the base station. Here, the performance evaluation result may be an AI LLR value based on a channel estimated using the channel estimation AI model. Alternatively, the performance evaluation result may be a difference between an AI LLR value based on a channel estimated using the channel estimation AI model and a basic LLR value.

Then, the base station may receive information on the model identifier of the changed channel estimation AI model from the second channel estimation unit of the terminal, and may receive a change request for the changed AI model. In addition, the base station may receive the channel estimation performance evaluation result for the changed channel estimation AI model from the second channel estimation unit of the terminal. Accordingly, the base station may identify that the corresponding receiver can obtain improved channel estimation performance based on the changed channel estimation AI model. Based thereon, the base station may obtain improved channel estimation performance by performing channel estimation using the changed channel estimation AI model based on the received information on the model identifier of the changed channel estimation AI model.

Such the channel estimation performance degradation evaluation may be periodically performed at an interval according to the performance degradation evaluation interval in the second channel estimation unit of the terminal.

Meanwhile, the base station may transmit a reference signal to the terminal. Then, the second channel estimation unit included in the terminal may receive the reference signal and perform channel estimation using the currently applied channel estimation AI model. In addition, the base station may transmit a reference broadcasting signal to the terminal. Here, the reference broadcasting signal may be a periodically-broadcast signal such as an SSB.

Accordingly, the second channel estimation unit of the terminal may attempt to receive the reference broadcasting signal based on a channel estimated using the currently applied channel estimation AI model. However, the second channel estimation unit of the terminal may fail to receive the reference broadcasting signal based on the estimated channel. In this case, the terminal may estimate the channel using the first channel estimation unit. Then, the first channel estimation unit of the terminal may receive the reference broadcasting signal based on the estimated channel. In this case, the first channel estimation unit of the terminal may succeed in receiving the reference broadcasting signal. In this manner, a reception failure of the reference broadcasting signal by the second channel estimating unit of the terminal may continue for a certain period of time, or a reception success of the reference broadcasting signal by the first channel estimating unit of the terminal may continue for a predetermined period of time.

In this case, the second channel estimation unit of the terminal may determine that the channel estimation performance has deteriorated to the extent that it is difficult to use the currently applied channel estimation AI model. Accordingly, the second channel estimation unit of the terminal may report the channel estimation performance degradation by transmitting the evaluation result of the evaluated channel estimation performance degradation to the base station. Here, the performance degradation evaluation result may include information on the fact of the reception failure and the failure period for the channel estimated using the currently applied channel estimation AI model. Then, the base station may receive the performance degradation evaluation result from the second channel estimation unit of the terminal. In addition, the base station may determine that channel estimation performance has deteriorated to the extent that it is difficult for the terminal to use the currently applied channel estimation AI model.

Figure 11:
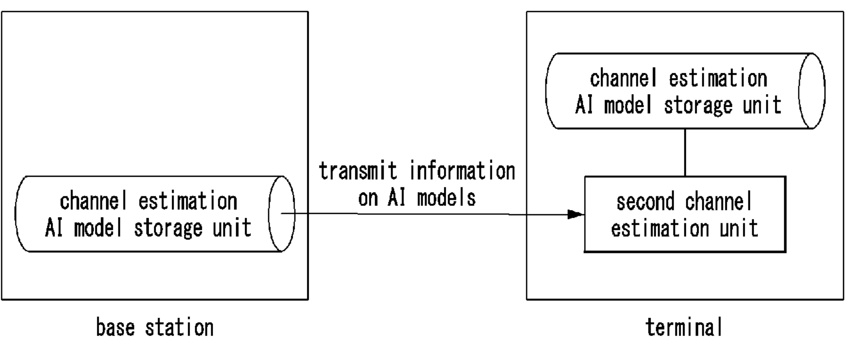
FIG. 11 is a conceptual diagram of a first exemplary embodiment of a method for transmitting information on channel estimation AI models.

FIG. 11 is a conceptual diagram of a first exemplary embodiment of a method for transmitting information on channel estimation AI models.

Referring to FIG. 11, the channel estimation AI model storage unit of the base station may have information on channel estimation AI models identified by model identifiers. In addition, the base station may transmit information on the channel estimation AI models, including information on the model identifiers, to the second channel estimation unit of the terminal. The second channel estimation unit of the terminal may receive information on the channel estimation AI models including information on the model identifiers from the base station, and store the information in its channel estimation AI model storage unit. The second channel estimation unit of the terminal may estimate a channel using the channel estimation AI models stored in the channel estimation AI model storage unit.

Figure 12:
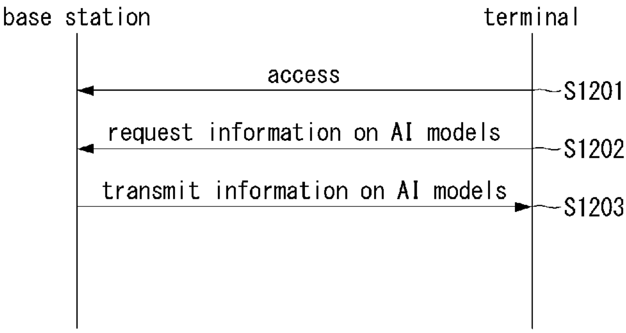
FIG. 12 is a sequence chart of a second exemplary embodiment of a method for transmitting information on channel estimation AI models.

FIG. 12 is a sequence chart of a second exemplary embodiment of a method for transmitting information on channel estimation AI models.

Referring to FIG. 12, the channel estimation AI model storage unit of the base station may have information on channel estimation AI models identified by model identifiers. Meanwhile, the terminal may access the base station through an access procedure (S1201). Then, the terminal may request information on the channel estimation AI models by transmitting channel characteristic information to the base station (S1202). Here, a channel of subjected to the channel characteristic information may be a downlink channel from the base station to the terminal, and the channel characteristic information may include values such as a maximum Doppler frequency and a delay variance of the downlink channel.

Then, the base station may receive the request of transmitting information on the channel estimation AI models including the channel characteristic information from the terminal. Accordingly, the base station may select channel estimation AI models suitable for the terminal based on the channel characteristic information received from the terminal. In this case, the base station may select channel estimation AI models suitable for the terminal by further considering a position of the terminal. Then, the base station may transmit information on the selected channel estimation AI models, including information on model identifiers thereof, to the terminal (S1203). In this case, the base station may compress the information on the channel estimation AI models and transmit the compressed information to the terminal. The terminal may receive the compressed information on the channel estimation AI models from the base station, decompress the information, and store the information in its channel estimation AI model storage unit. The terminal may estimate a channel by using the channel estimation AI models stored in the channel estimation AI model storage unit.

Figure 13:
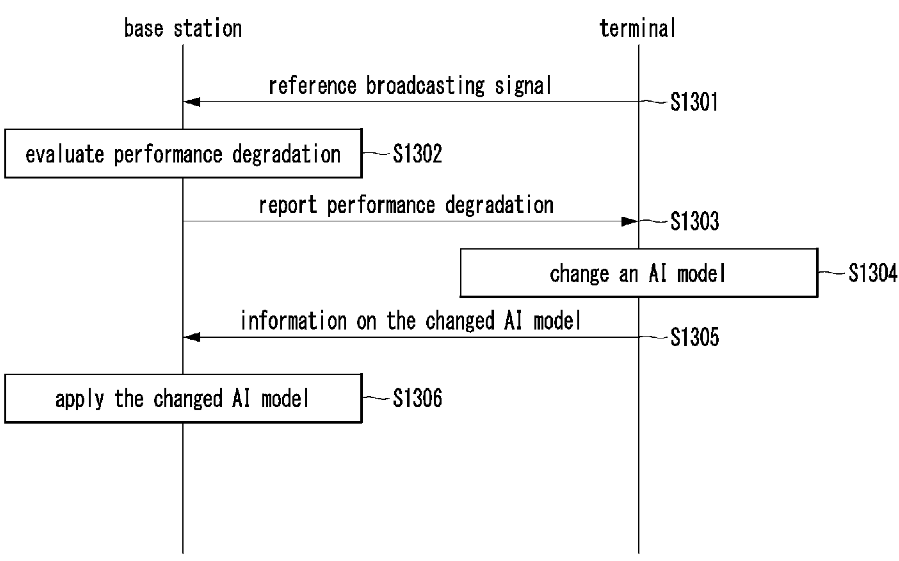
FIG. 13 is a sequence chart of a third exemplary embodiment of a method for transmitting information on channel estimation AI models.

FIG. 13 is a sequence chart of a third exemplary embodiment of a method for transmitting information on channel estimation AI models.

Referring to FIG. 13, the base station may generate channel estimation performance degradation evaluation configuration information for configuring a channel estimation performance degradation evaluation function in the terminal. In this case, the channel estimation performance degradation evaluation configuration information may include information on a channel estimation performance degradation evaluation interval, information on the number of iterations of performance degradation evaluation when performing the performance degradation evaluation, information on a degradation threshold, and/or the like.

The base station may transmit the generated channel estimation performance degradation evaluation configuration information to the second channel estimation unit of the terminal. Then, the second channel estimation unit of the terminal may receive the channel estimation performance degradation evaluation configuration information from the base station. Then, the second channel estimation unit of the terminal may configure the channel estimation performance degradation evaluation function according to the received channel estimation performance degradation evaluation configuration information.

Meanwhile, the base station may transmit a reference signal to the terminal. The first channel estimation unit included in the terminal may perform channel estimation by receiving the reference signal. Thereafter, the base station may transmit a reference broadcasting signal to the terminal (S1301). Here, the reference broadcasting signal may be a periodically-broadcast signal such as an SSB. Accordingly, the first channel estimation unit of the terminal may receive the reference broadcasting signal based on a channel estimated using the reference signal.

Then, the first channel estimation unit of the terminal may evaluate a reception performance of the received reference broadcasting signal. In this case, the first channel estimation unit of the terminal may evaluate the reception performance of the reference broadcasting signal multiple times according to the number of iterations of performance degradation evaluation.

In this case, an indicator representing the reception performance evaluated by the first channel estimation unit of the terminal may be an LLR value when receiving the reference broadcasting signal. The first channel estimation unit of the terminal may calculate an average value of reception performances performed several times according to the number of iterations of performance degradation evaluation. For example, the average value of reception performances evaluated by the first channel estimation unit of the terminal may be a basic average LLR value. Here, the basic average LLR value may be expressed also as a baseline LLR value.

Meanwhile, the second channel estimation unit included in the terminal may perform channel estimation using an applied channel estimation AI model by receiving the reference signal. In addition, the second channel estimation unit of the terminal may evaluate a reception performance of the reference broadcasting signal received based on a channel estimated using the channel estimation AI model. In this case, the second channel estimation unit of the terminal may evaluate the reception performance of the reference broadcasting signal multiple times according to the number of iterations of performance degradation evaluation. In this case, an indicator representing the reception performance evaluated by the second channel estimation unit of the terminal may be an LLR value when receiving the reference broadcasting signal. As a result, the second channel estimation unit of the terminal may calculate an average value of the reception performances evaluated for the reference broadcasting signal received multiple times according to the number of iterations of performance degradation evaluation. For example, the average value of the reception performances evaluated by the second channel estimation unit of the terminal may be an applied AI average LLR value. Here, the applied AI average LLR value may be expressed also as an applied AI LLR value.

Meanwhile, the second channel estimation unit of the terminal may compare the applied AI LLR value based on the channel estimated using the applied AI model with the basic LLR value to evaluate the performance degradation (S1302). In this case, the second channel estimation unit of the terminal may calculate a difference between the applied AI LLR value and the basic LLR value. Here, the difference may be a value obtained by subtracting the applied AI LLR value from the basic LLR value. Then, the second channel estimation unit of the terminal may determine whether the difference is greater than or equal to the degradation threshold.

As a result of the determination, the second channel estimation unit of the terminal may determine that the channel estimation performance has deteriorated to such an extent that it is difficult to use the currently applied channel estimation AI model if the calculated difference is greater than or equal to the degradation threshold. Accordingly, the second channel estimation unit of the terminal may report the channel estimation performance degradation by transmitting the evaluation result of the channel estimation performance degradation to the base station (S1303). Here, the performance degradation evaluation result may be the applied AI LLR value based on the channel estimated using the currently applied channel estimation AI model. Alternatively, the performance degradation evaluation result may be a difference between the applied AI LLR value based on the channel estimated using the currently-applied channel estimation AI model and the basic LLR value. Also, the performance degradation evaluation result may include channel characteristic information. Here, a channel subjected to the channel characteristic information may be a downlink channel from the base station to the terminal, and the channel characteristic information may include values such as a maximum Doppler frequency and a delay variance of the downlink channel.

Then, the base station may receive the performance degradation evaluation result from the second channel estimation unit of the terminal. In addition, the base station may determine that channel estimation performance has deteriorated to the extent that it is difficult for the terminal to use the currently applied channel estimation AI model.

Accordingly, the base station may change the currently applied channel estimation model to a channel estimation AI model suitable for the terminal based on the performance degradation evaluation result report including the channel characteristic information received from the terminal (S1304). In this case, the base station may select the channel estimation AI model suitable for the terminal by further considering the position of the terminal. Then, the base station may transmit information on the changed channel estimation AI model including a model identifier thereof to the terminal (S1305). In this case, the base station may compress the information on the channel estimation AI model and transmit it to the terminal. The terminal may receive the compressed information on the channel estimation AI model from the base station, decompress the information, and store the information in its channel estimation AI model storage unit. The terminal may estimate a channel using the channel estimation AI model stored in its channel estimation AI model storage unit (S1306).

Meanwhile, the terminal may periodically measure channel characteristics to evaluate a degree of change in the channel characteristics. The terminal may report the change in the channel characteristics to the base station according to the evaluation result of the degree of change in the channel characteristics. Reporting of such the changed channel characteristics may be irrelevant to performance degradation of the channel estimation AI model. In this case, the terminal may report the degree of channel estimation performance to the base station together with the channel characteristic information.

Then, the base station may receive the report of the changed channel characteristics from the terminal. In addition, the base station may determine that the channel characteristics have changed to such an extent that it is difficult for the terminal to use the currently-applied channel estimation AI model. Accordingly, the base station may select a channel estimation AI model suitable for the terminal based on the channel characteristic information received from the terminal. In this case, the base station may select the channel estimation AI suitable for the terminal by further considering the position of the terminal. Then, the base station may transmit information on the changed channel estimation AI model, including a model identifier thereof, to the terminal. In this case, the base station may compress information on the channel estimation AI model and transmit it to the terminal. The terminal may receive the compressed information on the channel estimation AI model including the model identifier from the base station, decompress the information, and store the information in its channel estimation AI model storage unit. The terminal may estimate a channel by using the channel estimation AI model stored in its channel estimation AI model storage unit.

Meanwhile, a receiver of the mobile communication network may perform a channel estimation operation based on the AI model to improve performance. In this case, the receiver may have an AI model itself. Alternatively, the base station may manage AI models, it may transmit information on the AI models being managed to the receiver.

Then, the terminal may perform channel estimation by receiving information on an AI model from the base station and applying the AI model. In this case, the AI model may be in an insufficiently trained state. In addition, the channel environment may change from time to time. In this case, channel estimation using the AI model may not improve performance significantly.

The channel estimation AI model may be pre-trained to produce good performance in various real environments through simulation in a situation where it has not experienced an actual channel environment. As such, AI models pre-trained in the simulation environment may be difficult to show good performance. Accordingly, the present disclosure proposes an AI model update method capable of preparing an operation in a real environment in order to solve these difficulties. Alternatively, the present disclosure proposes a method for updating an AI model operating in a real environment in order to solve such the difficulties.

The proposed method of updating the AI model may be performed in the step of performing channel estimation based on the AI model. Such the update method may be performed through learning to further improve the performance of the AI model when data reception is successful. To this end, the receiver may generate a gradient vector of a deep neural network.

Figure 14:
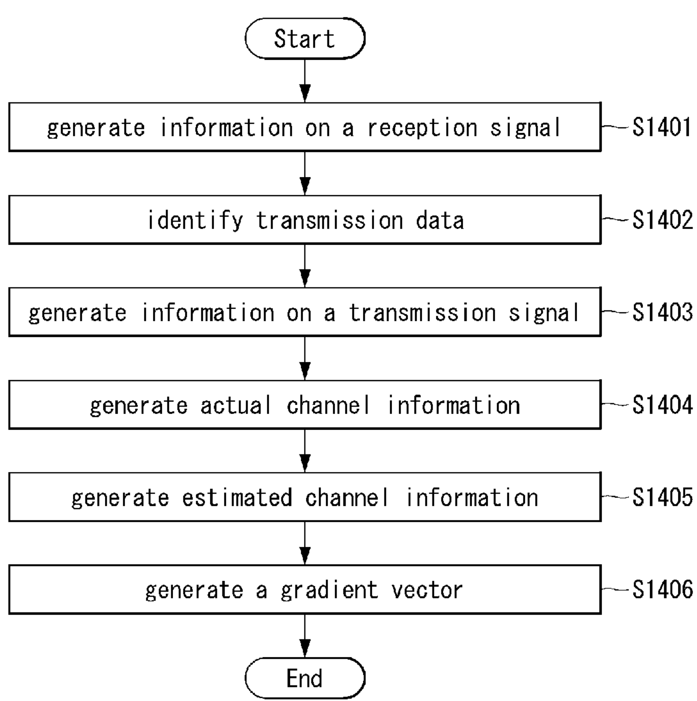
FIG. 14 is a diagram illustrating a method of generating a gradient vector of a deep neural network according to a first exemplary embodiment.

FIG. 14 is a diagram illustrating a method of generating a gradient vector of a deep neural network according to a first exemplary embodiment.

Referring to FIG. 14, when performing a data reception procedure, the receiver may generate information Y on a reception signal in a reception resource, and store the information in a memory (S1401). The receiver may identify transmission data when reception of data is successful (S1402). Then, the receiver may generate information X on a transmission signal by perform a transmission procedure again using the transmission data (S1403). Thereafter, the receiver may generate actual channel information H using the information on the transmission signal and the information on the reception signal (S1404). The receiver may generate error information by comparing channel information H' estimated using the AI model with the actual channel information H (S1405). Thereafter, the receiver may generate a gradient vector of a deep neural network by applying a back propagation method (S1406).

Figure 15:
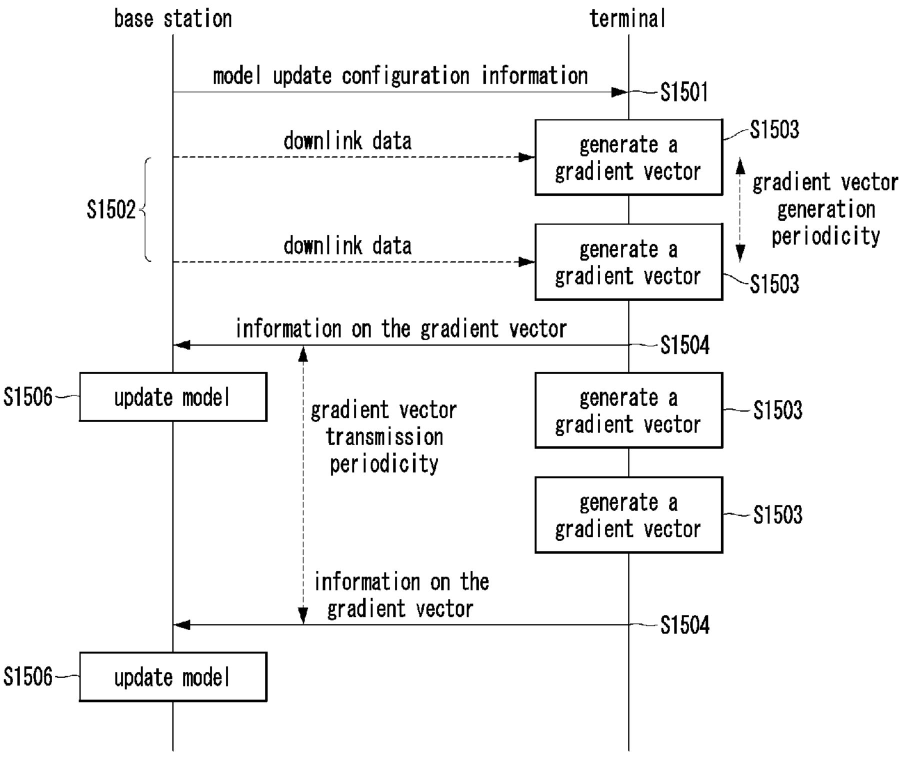
FIG. 15 is a sequence chart illustrating a first exemplary embodiment of a method for updating a channel estimation AI model.

FIG. 15 is a sequence chart illustrating a first exemplary embodiment of a method for updating a channel estimation AI model.

Referring to FIG. 15, the base station may generate update configuration information for AI models. Here, the update configuration information may include information on a gradient vector generation periodicity and information on a gradient vector transmission periodicity. The base station may transmit the generated update configuration information to the terminal (S1501). Then, the terminal may receive the update configuration information and recognize the gradient vector generation periodicity and the gradient vector transmission periodicity from the received update configuration information.

Meanwhile, the base station may continuously transmit downlink data to the terminal (S1502). Then, the terminal may receive the downlink data from the base station, and when performing a data reception procedure, the terminal may generate information Y on a reception signal in a reception resource and store it in a memory. When reception of data is successful, the terminal may identify transmission data. Then, the terminal may generate information X on a transmission signal by performing a transmission procedure again using the transmission data. Thereafter, the terminal may generate actual channel information H using the information on the transmission signal and the information on the reception signal.

In addition, the terminal may generate error information by comparing channel information H' estimated using an AI model with the actual channel information H. Thereafter, the terminal may generate a gradient vector of a deep neural network by applying the back propagation method. The terminal may periodically perform the process of generating a gradient vector according to the gradient vector generation periodicity (S1503).

Thereafter, the terminal may periodically transmit information on the generated gradient vector to the base station (S1504). The terminal may transmit a gradient vector obtained by adding all generated gradient vectors to the base station according to the gradient vector transmission periodicity. In addition, the terminal may transmit information on the AI model used to generate the gradient vector to the base station. Accordingly, the base station may periodically receive information on the gradient vector from the terminal and may periodically update the AI model (S1505). In this case, since the base station receives information on the AI model used to generate the gradient vector together, the base station may identify information on the AI model used to generate the gradient vector.

The terminal may update the AI model whenever a gradient vector is generated. Alternatively, the terminal may update the AI model whenever the gradient vector is transmitted to the base station. When the terminal has its own AI model, the model may be updated by generating a gradient vector as described above and then adding the gradient vector to each element of a deep neural network of the AI model.

Even if the terminal does not succeed in reception based on the AI model, when data reception succeeds through the basic channel estimation model, a gradient vector for improving the performance of the AI model may be generated and the model update operation may be performed by restoring the transmission signal and channel information similarly.

As described above, the terminal may generate the gradient vector based on actually transmitted data to update the AI model. However, for this purpose, the terminal may perform a procedure of generating a transmission signal from transmission data again after receiving the data. In addition, the terminal may store channels of all resources in memory when performing reception. This may be a factor that makes learning difficult for a terminal having limitations in processing capability and memory. In order to solve this problem, the base station may transmit a dedicated signal previously known to the receiver in data transmission resources in order to more easily train the AI model.

Figure 16:
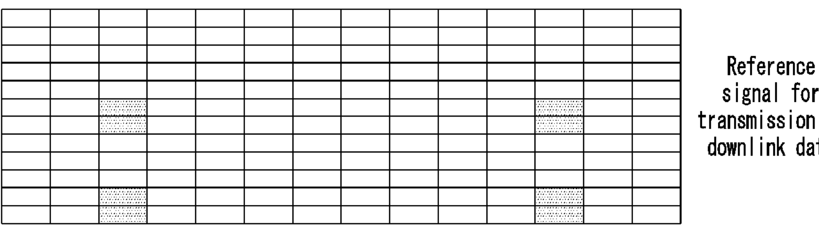
FIG. 16 is a conceptual diagram illustrating a first exemplary embodiment of a dedicated signal.

FIG. 16 is a conceptual diagram illustrating a first exemplary embodiment of a dedicated signal.

Referring to FIG. 16, a dedicated signal may have the same form as a demodulation reference signal. The base station may arrange 4 demodulation reference signals in one symbol. Accordingly, the base station may transmit 8 demodulation reference signals using two symbols. Such the dedicated signal may be transmitted for a specific terminal. Alternatively, such the dedicated signal may be transmitted so that all terminals within a cell can receive it and perform training using it. In this manner, when the base station transmits the dedicated signal for a specific terminal, a terminal-specific access number may be used as an initial value for generation of the dedicated signal. Alternatively, when the base station transmits the dedicated signal for all terminals within the cell, a cell-specific number may be used as an initial value for generation of the dedicated signal.

Figure 17:
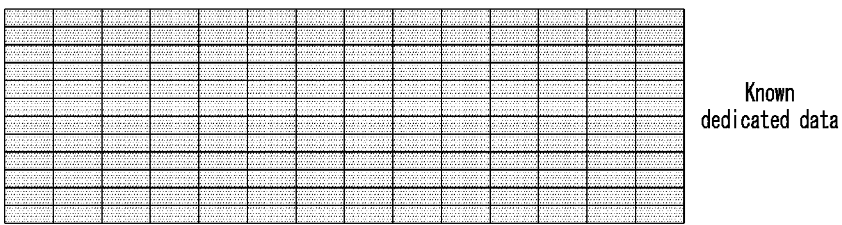
FIG. 17 is a conceptual diagram illustrating a second exemplary embodiment of a dedicated signal.

FIG. 17 is a conceptual diagram illustrating a second exemplary embodiment of a dedicated signal.

Referring to FIG. 17, a dedicated signal may be transmitted in data transmission resources. Such the dedicated signal may be transmitted for a specific terminal. Alternatively, such the dedicated signal may be transmitted so that all terminals within a cell can receive it and perform training using it. In this manner, when the base station transmits the dedicated signal for a specific terminal, a terminal-specific access number may be used as an initial value for generation of the dedicated signal. Alternatively, when the base station transmits the dedicated signal to all terminals within the cell, a cell-specific number may be used as an initial value for generation of the dedicated signal.

Figure 18:
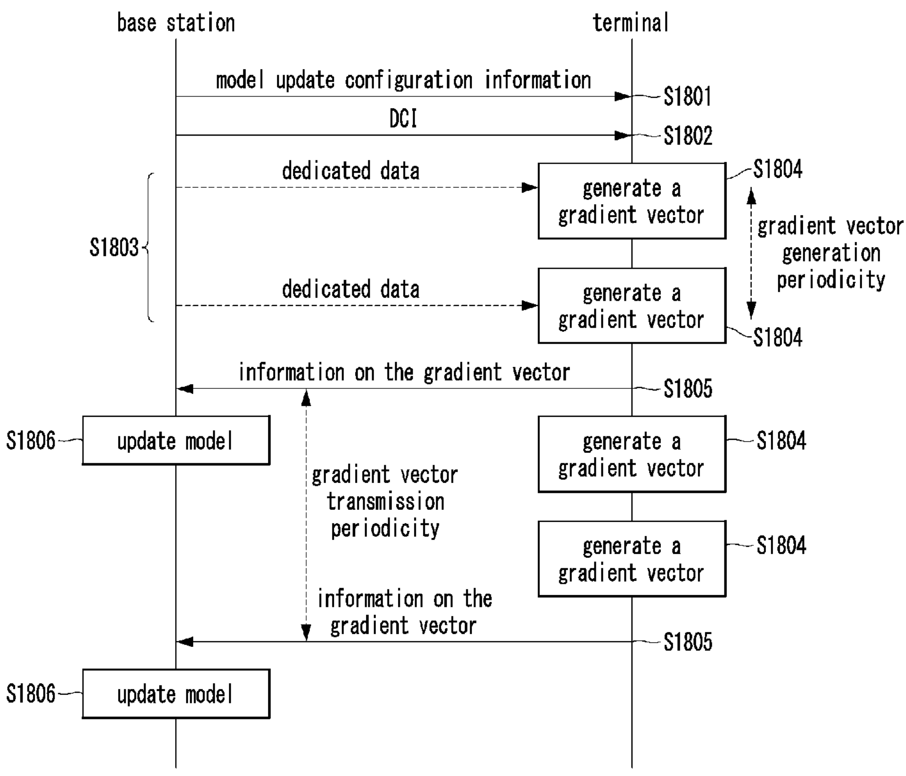
FIG. 18 is a sequence chart illustrating a second exemplary embodiment of a channel estimation AI model update method.

FIG. 18 is a sequence chart illustrating a second exemplary embodiment of a channel estimation AI model update method.

Referring to FIG. 18, the base station may generate update configuration information for AI models. Here, the update configuration information may include information on a gradient vector generation periodicity and information on a gradient vector transmission periodicity. The base station may transmit the generated update configuration information to the terminal (S1801). Then, the terminal may receive the update configuration information and identify the gradient vector generation periodicity and the gradient vector transmission periodicity from the received update configuration information.

The base station may enable the terminal to know a position of a transmission resource through a resource allocation procedure for known dedicated data transmission. To this end, the base station may generate downlink control information (DCI) including an indicator indicating the known dedicated data, frequency resource allocation information, time resource allocation information, antenna port information for generating the dedicated data (e.g., the maximum number of antenna ports), and the like. Then, the base station may transmit the generated DCI to the terminal (S1802). In this case, the base station may transmit a DCI message scrambled using a cell-RNTI (C-RNTI) to the terminal when targeting an individual terminal so that only the corresponding terminal can receive it. Unlike this, the base station may transmit a DCI message scrambled using a common value (e.g., AI-based CE RNTI (AICE-RNTI)) when targeting all terminals within the cell so that all terminals can receive it. Then, the terminal may receive the DCI message, and identify a time and frequency resource in which the terminal can receive the dedicated signal.

Meanwhile, the base station may continuously transmit the dedicated data to the terminal (S1803). Then, the terminal may receive the dedicated data based on the DCI from the base station, and when performing a data reception procedure, the terminal may generate information Y on a reception signal in a reception resource and store it in its memory. When the terminal succeeds in receiving the dedicated data, the terminal may identify the dedicated data. Then, the terminal may generate information X on a transmission signal by using the dedicated data. Thereafter, the terminal may generate actual channel information H using the information on the transmission signal and the information on the reception signal.

In addition, the terminal may generate error information by comparing channel information H' estimated using the AI model and the actual channel information H. Thereafter, the terminal may generate a gradient vector of a deep neural network by applying a back propagation method. The terminal may periodically perform the process of generating a gradient vector according to the gradient vector generation periodicity (S1804).

Thereafter, the terminal may periodically transmit information on the generated gradient vector to the base station (S1805). The terminal may transmit a gradient vector obtained by adding all generated gradient vectors to the base station according to the gradient vector transmission periodicity. In addition, the terminal may transmit information on the AI model used to generate the gradient vector to the base station. Accordingly, the base station may periodically receive the information on the gradient vector from the terminal and may periodically update the AI model (S1806). In this case, the base station may receive information on the AI model used to generate the gradient vector together, so that the base station identifies the information on the AI model used to generate the gradient vectors.

The terminal may update the AI model whenever a gradient vector is generated. Alternatively, the terminal may update the AI model whenever the gradient vector is transmitted to the base station. When the terminal has its own AI model, the model may be updated by generating a gradient vector as described above and then adding the gradient vector to each element of a deep neural network of the AI model.

Even if the terminal does not succeed in reception based on the AI model, when data reception succeeds through the basic channel estimation model, a gradient vector for improving the performance of the AI model may be generated and the model update operation may be performed by restoring the transmission signal and channel information similarly.

Figure 19:
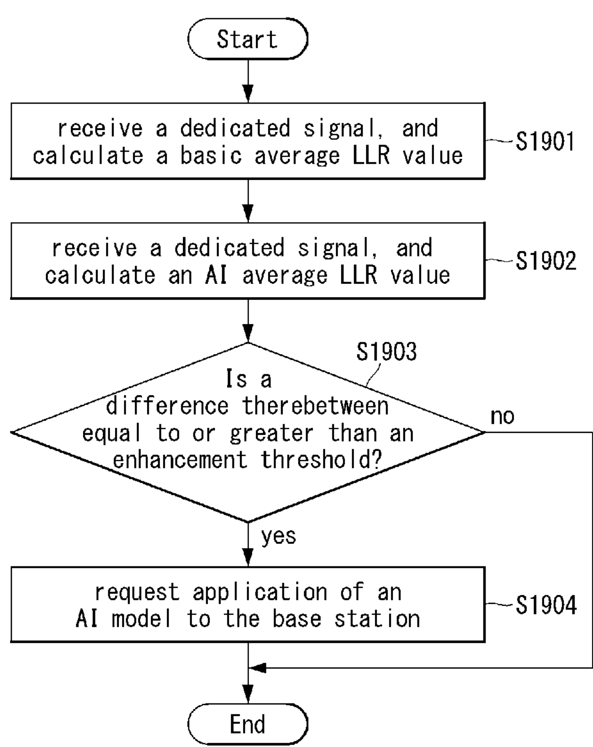
FIG. 19 is a flowchart illustrating a third exemplary embodiment of a channel estimation performance evaluation method in a communication system.

FIG. 19 is a flowchart illustrating a third exemplary embodiment of a channel estimation performance evaluation method in a communication system.

Referring to FIG. 19, the base station may generate channel estimation performance evaluation configuration information for configuring a channel estimation performance evaluation function in the terminal. In this case, the channel estimation performance evaluation configuration information may include information on a channel estimation performance evaluation interval, information on the number of iterations of performance evaluation when performing the performance evaluation, information on a threshold, and/or the like. In addition, the channel estimation performance evaluation configuration information may include information on a dedicated signal. In this case, the information on the dedicated signal may include an indicator indicating the dedicated data, frequency resource allocation information, time resource allocation information, antenna port information for generating the dedicated data (e.g., the maximum number of antenna ports), and/or the like.

The base station may transmit the generated channel estimation performance evaluation configuration information to the second channel estimation unit of the terminal. Then, the second channel estimation unit of the terminal may receive the channel estimation performance evaluation configuration information from the base station. Then, the second channel estimation unit of the terminal may configure the channel estimation performance evaluation function according to the received channel estimation performance evaluation configuration information.

Meanwhile, the base station may transmit a reference signal to the terminal. The first channel estimation unit included in the terminal may perform channel estimation by receiving the reference signal. In addition, the base station may transmit a dedicated signal to the terminal. Accordingly, the first channel estimation unit of the terminal may receive the dedicated signal based on a channel estimated using the reference signal. Then, the first channel estimation unit of the terminal may evaluate a reception performance of the received dedicated signal.

In this case, the first channel estimation unit of the terminal may evaluate the reception performance of the dedicated signal multiple times according to the number of iterations of the performance evaluation. In this case, an indicator representing the reception performance evaluated by the first channel estimation unit of the terminal may be an LLR value when receiving the dedicated signal. The first channel estimation unit of the terminal may calculate an average value of the reception performances evaluated several times according to the number of iterations of the performance evaluation (S1901). For example, the average value of reception performances evaluated by the first channel estimation unit of the terminal may be a basic average LLR value. Here, the basic average LLR value may be expressed also as a baseline LLR value.

Meanwhile, the base station may transmit a reference signal to the terminal. Then, the second channel estimation unit included in the terminal may receive the reference signal and perform channel estimation using each channel estimation AI model. In addition, the base station may transmit a dedicated signal to the terminal. Accordingly, the second channel estimation unit of the terminal may receive the dedicated signal based on each channel estimated using each channel estimation AI model.

The second channel estimation unit of the terminal may evaluate a reception performance of the received dedicated signal for each estimated channel. In this case, the second channel estimation unit of the terminal may evaluate the reception performance of the dedicated signal multiple times according to the number of iterations of the performance evaluation. In this case, an indicator representing the reception performance evaluated by the second channel estimation unit of the terminal may be an LLR value when receiving the dedicated signal.

As a result, the second channel estimation unit of the terminal may calculate an average value of reception performances evaluated for the dedicated signals received several times according to the number of iterations of the performance evaluation (S1902). For example, the average value of reception performances evaluated by the second channel estimation unit of the terminal may be an AI average LLR value. Here, the AI average LLR value may be expressed also as an AI LLR value.

Meanwhile, the second channel estimation unit of the terminal may compare each AI LLR value based on each channel estimated using each AI model with the basic LLR value. Then, the second channel estimation unit of the terminal may calculate a difference between each AI LLR value and the basic LLR value. Thereafter, the second channel estimation unit of the terminal may determine whether the difference is greater than or equal to a specific threshold (S1903).

As a result of the determination, the second channel estimation unit of the terminal may select channel estimation AI models having a calculated difference equal to or greater than the specific threshold. In addition, the second channel estimation unit of the terminal may request application of a channel estimation AI model by transmitting information on model identifiers of the selected channel estimation AI models having a difference equal to or greater than the specific threshold to the base station (S1904).

In this case, the second channel estimation unit of the terminal may transmit a performance evaluation result of channel estimation evaluated for each of the selected channel estimation AI models to the base station. Here, the performance evaluation result may include an AI LLR value based on a channel estimated using each channel estimation AI model. Alternatively, the performance evaluation result may include the difference between the basic LLR value and the AI LLR value based on each channel estimation AI model.

Then, the base station may receive information on model identifiers of the selected channel estimation AI models from the second channel estimation unit of the terminal, and may receive an application request for the selected AI models. In addition, the base station may receive the performance evaluation result of channel estimation evaluated for each of the channel estimation AI models selected from the second channel estimation unit of the terminal.

Here, the performance evaluation result may include the AI LLR value evaluated for a channel estimated using each channel estimation AI model. Alternatively, the performance evaluation result may include the difference between the basic LLR value and the AI LLR value based on each channel estimated using each channel estimation AI model.

Accordingly, the base station may perform channel estimation using one AI model among the channel estimation AI models selected based on the information on the received model identifiers. In this case, the base station may perform channel estimation using one AI model in consideration of the performance evaluation result of the selected AI channel estimation models.

For example, the base station may perform channel estimation by applying a channel estimation AI model having the best performance evaluation result among the selected channel estimation AI models. Here, the channel estimation AI model having the best performance evaluation result may have the largest difference.

Here, the channel estimation AI model having the best performance evaluation result may have the maximum difference. Alternatively, the channel estimation AI model having the best performance evaluation result may have the maximum AI LLR value.

The second channel estimation unit of the terminal may request application of the AI model by transmitting, to the base station, information on a model identifier of the channel estimation AI model having the maximum difference (or having the maximum AI LLR value) among the selected channel estimation AI models having a difference equal to or greater than the specific threshold. Then, the base station may receive information on the model identifier of the channel estimation AI model having the maximum difference among the selected channel estimation AI models from the second channel estimation unit of the terminal, and receive the request of applying the selected AI model.

Accordingly, the base station may identify that the corresponding receiver can obtain improved channel estimation performance based on the channel estimation AI model. Based thereon, the base station may obtain improved channel estimation performance by performing channel estimation by applying the channel estimation AI model selected based on the information on the received model identifier.

Such the channel estimation performance evaluation may be periodically performed by the second channel estimation unit of the terminal at a corresponding interval according to the performance evaluation interval. In addition, the performance evaluation result may include information on the channel estimation AI model. Here, the information on the channel estimation AI model may include information for expressing characteristics of a channel suitable for the operation of the corresponding AI channel estimation model.

For example, the information on the channel estimation AI model may be information obtained by expressing channel characteristics as a delay spread and a Doppler frequency shift, and quantizing the two values. In addition, the information on the channel estimation AI model may include information such as a signal to interference plus noise ratio (SINR).

Meanwhile, the terminal may virtually generate one or more reference signal patterns. In addition, the terminal may evaluate channel estimation performance for each generated virtual reference signal pattern.

Figure 20:
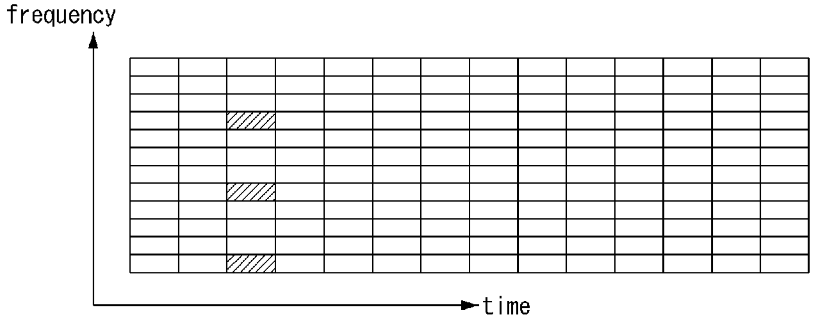
FIG. 20 is a conceptual diagram illustrating a first exemplary embodiment of a virtual reference signal pattern.

FIG. 20 is a conceptual diagram illustrating a first exemplary embodiment of a virtual reference signal pattern.

Referring to FIG. 20, a virtual reference signal pattern may be a pattern obtained by reducing reference signal(s) from a basic reference signal pattern. The virtual reference signal pattern information may be expressed by adding basic signal reduction information to information on position(s) of basic reference signal(s). The information on the virtual reference signal pattern may include DMRS mapping type information, DMRS configuration type information, DMRS length information, DMRS additional position information, DMRS type A position information, resource reduction unit information, density reduction level information, and/or the like. Here, the resource reduction unit information may indicate either a CDM group or an RB. The density reduction level information may include a reduction degree such as ½, ⅓, or ¼.

Meanwhile, when receiving a dedicated signal, the terminal may estimate expected channel estimation performance by combining various virtual reference signal patterns. In addition, when a performance improvement of a channel estimated using the AI model is determined, the terminal may additionally transmit information on a used virtual reference signal pattern when reporting the performance improvement to the base station. The base station may receive the information on the virtual reference signal pattern from the terminal. Thereafter, the base station may utilize the information on the virtual reference signal pattern used by the terminal to determine a density of reference signals to be used in data transmission.

Meanwhile, procedures such as model performance evaluation, application, and model change of the present disclosure may also be applied to other AI functions operating in the terminal. In this case, applicable AI functions may be as follows.

Beam prediction (e.g., spatial domain, time domain) AI functions

AI functions such as channel status/state information (CSI) compression and CSI prediction AI functions such as positioning prediction For example, in the CSI compression, application of an AI model may be requested when a performance improvement is identified after evaluating the performance of AI-based CSI compression instead of the step S402 of FIG. 4. Further, the case of FIG. 10 may be applied similarly. Also in the case of FIG. 13, when performance degradation is identified, a change of the model may be applied.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. An operation method of a terminal using a channel estimation artificial intelligence (AI) model in a communication system, the operation method comprising:

transmitting, to a base station, a signal indicating application of the channel estimation AI model of the terminal;

receiving, from the base station, density reduction configuration information for a first signal A, wherein the first signal A is generated by reducing a density of a signal A received from the base station, and wherein the density reduction configuration information includes information on a resource reduction unit and information on a density reduction level for generating the first signal A from the signal A;

performing first channel estimation using the channel estimation AI model by receiving the first signal A based on the density reduction configuration information from the base station; and receiving, from the base station, data based on the estimated channel.

2. The operation method according to claim 1, further comprising:

receiving, from the base station, performance evaluation configuration information;

performing second channel estimation by receiving a second signal A from the base station;

calculating a first reception performance indicator by receiving a first signal B from the base station based on the second channel estimation;

performing third channel estimation using the channel estimation AI model by receiving a third signal A from the base station; and calculating a second reception performance indicator by receiving a second signal B from the base station based on the third channel estimation.

3. The operation method according to claim 2, wherein the first reception performance indicator is a log likelihood ratio (LLR) value when receiving the first signal B, and the second reception performance indicator is an LLR value when receiving the second signal B.

4. The operation method according to claim 2, wherein the performance evaluation configuration information further includes information on a number of performance evaluation iterations, and the terminal uses an average value obtained by performing multiple reception performance evaluations according to the number of performance evaluation iterations as the first reception performance indicator or the second reception performance indicator.

5. The operation method according to claim 2, further comprising:

reporting a result of performance degradation of the channel estimation AI model to the base station when the first reception performance indicator is greater by a threshold or more than the second reception performance indicator.

6. The operation method according to claim 5, further comprising, when the result of the performance degradation further includes information on channel characteristics, receiving, from the base station, information on a channel estimation AI model changed based on the channel characteristics; and performing channel estimation using the changed channel estimation AI model.

7. The operation method according to claim 2, wherein each of the first signal B and the second signal B is a reference broadcasting signal or dedicated signal.

8. The operation method according to claim 2, further comprising:

calculating a third reception performance indicator based on the first reception performance indicator and the second reception performance indicator; and transmitting, to the base station, the third reception performance indicator.

9. The operation method according to claim 2, wherein the second signal A corresponds to a basic reference signal pattern and the third signal A corresponds to a virtual reference signal pattern obtained by reducing a density of the basic reference signal pattern and the second signal B is the first signal B.

10. The operation method according to claim 2, wherein the third signal A is the first signal A and the second signal B is the data.

11. The operation method according to claim 2, wherein each of the first signal B and the second signal B is a known dedicated data and each of the second signal A and the third signal A is a virtual reference signal pattern using a reference signal pattern.

12. The operation method according to claim 1, wherein the first signal A is a signal obtained by reducing a density of the signal A in unit of a code division multiplexing (CDM) group or a signal obtained by reducing the density of the signal A in unit of a resource block (RB).

13. The operation method according to claim 1, wherein the density reduction configuration information further includes information on an offset for each symbol.

14. The operation method according to claim 1, further comprising:

receiving, from the base station, update configuration information including information on a gradient vector generation periodicity and information on a gradient vector transmission periodicity; and calculating a gradient vector of a deep neural network based on the data according to the gradient vector generation periodicity.

15. The operation method according to claim 14, further comprising transmitting the calculated gradient vector to the base station according to the gradient vector transmission periodicity.

16. The operation method according to claim 14, further comprising updating the channel estimation AI model using the calculated gradient vector.

17. The operation method according to claim 14, wherein the calculating of the gradient vector comprises:

generating information on a reception signal from the downlink data;

identifying transmission data from the downlink data;

generating information on a transmission signal from the transmission data;

generating actual channel information using information on the transmission signal and information on the reception signal;

generating error information by comparing channel information estimated using the channel estimation AI model with the actual channel information; and calculating the gradient vector of the deep neural network by applying a backward propagation method to the error information.

18. An operation method of a terminal in a communication system, the operation method comprising:

receiving, from a base station, transmission information of dedicated data;

performing channel estimation using a channel estimation artificial intelligence (AI) model; and calculating a gradient vector based on a result of the channel estimation using the channel estimation AI model and a result of receiving the dedicated data.

19. The operation method according to claim 18, further comprising transmitting the calculated gradient vector to the base station.

20. The operation method according to claim 18, further comprising updating the channel estimation AI model using the calculated gradient vector.

21. An operation method of a base station in a communication system, the operation method comprising:

receiving, from a terminal, a signal indicating application of a channel estimation artificial intelligence (AI) model;

transmitting, to the terminal, density reduction configuration information for a first signal A, wherein the first signal A is generated by reducing a density of a signal A, and wherein the density reduction configuration information includes information on a resource reduction unit and information on a density reduction level for generating the first signal A from the signal A;

transmitting, to the terminal, the first signal A based on the density reduction configuration information; and transmitting, to the terminal, data.

22. The operation method according to claim 21, further comprising:

receiving, from the terminal, first channel characteristic information;

selecting a channel estimation AI model suitable for the terminal based on the first channel characteristic information; and transmitting, to the terminal, information on the selected channel estimation AI model.

23. The operation method according to claim 22, further comprising:

receiving, from the terminal, a model change request signal including second channel characteristic information;

selecting a channel estimation AI model changed based on the second channel characteristic information; and transmitting, to the terminal, information on the changed channel estimation AI model.

24. The operation method according to claim 22, further comprising:

transmitting, to the terminal, update configuration information including information on a gradient vector generation periodicity and information on a gradient vector transmission periodicity;

transmitting, to the terminal, downlink data according to the gradient vector generation periodicity;

receiving, from the terminal, a gradient vector calculated based on the downlink data according to the gradient vector transmission periodicity; and updating the channel estimation AI model based on the gradient vector.

25. The operation method according to claim 21, further comprising:

transmitting, to the terminal, a first signal B used for reception performance evaluation; and receiving, from the terminal, a first reception performance indicator for the channel estimation AI model.

26. The operation method according to claim 25, further comprising:

receiving, from the terminal, a second reception performance indicator including second channel characteristic information;

selecting a channel estimation AI model changed based on the second channel characteristic information when the second reception performance indicator is lower by a threshold or more than the first reception performance indicator; and transmitting, to the terminal, information on the changed channel estimation AI model.

* * * * *